(12) United States Patent
Kuscher et al.

(10) Patent No.: US 9,589,033 B1
(45) Date of Patent: Mar. 7, 2017

(54) PRESENTING RESULTS FROM MULTIPLE SEARCH ENGINES

(71) Applicant: Google Inc., Mountain View, CA (US)

(72) Inventors: Alexander Friedrich Kuscher, San Francisco, CA (US); John Nicholas Jitkoff, Palo Alto, CA (US); Jeffrey David Stark, San Francisco, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 14/053,535

(22) Filed: Oct. 14, 2013

(51) Int. Cl.
*G06F 17/30* (2006.01)

(52) U.S. Cl.
CPC .............................. *G06F 17/30554* (2013.01)

(58) Field of Classification Search
CPC .................................. G06F 17/30; G06F 17/00
See application file for complete search history.

(56) References Cited

U.S. PATENT DOCUMENTS

| | | | | |
|---|---|---|---|---|
| 5,873,080 | A * | 2/1999 | Coden | G06F 17/30017 |
| 6,327,590 | B1 * | 12/2001 | Chidlovskii | G06F 17/30867 |
| | | | | 707/734 |
| 6,601,061 | B1 * | 7/2003 | Holt | G06F 17/30864 |
| 6,654,742 | B1 * | 11/2003 | Kobayashi | G06F 17/3061 |
| 7,340,686 | B2 | 3/2008 | Matthews et al. | |
| 7,660,822 | B1 * | 2/2010 | Pfleger | G06F 17/30554 |
| | | | | 707/693 |
| 7,783,639 | B1 * | 8/2010 | Bharat | G06F 17/30864 |
| | | | | 707/736 |
| 8,086,604 | B2 | 12/2011 | Arrouye et al. | |
| 8,099,401 | B1 * | 1/2012 | Hsu | G06F 17/30964 |
| | | | | 707/705 |
| 8,442,972 | B2 * | 5/2013 | Ismalon | G06F 17/30867 |
| | | | | 707/713 |
| 9,009,135 | B2 * | 4/2015 | Gutlapalli | G06F 17/30 |
| | | | | 707/711 |
| 2007/0067305 | A1 * | 3/2007 | Ives | G06F 17/30864 |
| 2007/0174257 | A1 * | 7/2007 | Howard | G06F 17/30696 |
| 2007/0214097 | A1 * | 9/2007 | Parsons | G06F 17/30864 |
| | | | | 706/12 |
| 2008/0140643 | A1 * | 6/2008 | Ismalon | G06F 17/3053 |
| 2008/0201317 | A1 * | 8/2008 | Sue | G06F 17/30864 |
| 2009/0119173 | A1 * | 5/2009 | Parsons | G06Q 10/107 |
| | | | | 705/319 |
| 2010/0312782 | A1 * | 12/2010 | Li | G06F 17/30991 |
| | | | | 707/769 |
| 2013/0019237 | A1 | 1/2013 | Pardehpoosh et al. | |

(Continued)

OTHER PUBLICATIONS

Zamir, Oren, and Oren Etzioni. "Grouper: a dynamic clustering interface to Web search results." Computer Networks 31, No. 11 (1999): 1361-1374.*

*Primary Examiner* — Farhan Syed (74) *Attorney, Agent, or Firm* — McDermott Will & Emery LLP (57) ABSTRACT

Systems and methods for presenting search results from multiple sources are provided. In some aspects, a search query is received. The search query is provided to multiple search engines. Multiple search results corresponding to the search query are received from the multiple search engines. The multiple search results are sorted according to an order. At least a portion of the multiple search results are presented. The presented search results are selected based on the order.

20 Claims, 6 Drawing Sheets

(56) References Cited

U.S. PATENT DOCUMENTS

2013/0060763 A1* 3/2013 Chica ............... G06F 17/30699
  707/723
2013/0135332 A1* 5/2013 Davis ..................... G06F 17/30
  345/589
2013/0326583 A1 12/2013 Freihold et al.

* cited by examiner

PRESENTING RESULTS FROM MULTIPLE SEARCH ENGINES

BACKGROUND

The subject technology is generally directed to search interfaces for computing devices.

A user of a computing device may run a search using an application launcher of the computing device. However, the search results provided using the application launcher may be limited, and the user may desire different type(s) of search results than those provided by the application launcher. As the foregoing illustrates, a new approach for generating and presenting search results may be desirable.

SUMMARY

In some aspects, the disclosed subject matter relates to a computer-implemented method for presenting search results. The method includes receiving, at a computing device, a search query. The method includes providing the search query to multiple search engines, where each of the multiple search engines searches a corresponding data store, and where the multiple search engines include a local search engine configured to search a local data store and an online search engine configured to search an online data store. The method includes receiving, from the multiple search engines, multiple search results corresponding to the search query. The method includes sorting the multiple search results according to an order. The method includes presenting, at the computing device, at least a portion of the multiple search results, the presented search results being selected based on the order.

In some aspects, the disclosed subject matter relates to a non-transitory computer-readable medium encoded with executable instructions. The instructions include code for receiving one or more user interactions with a search input box. The instructions include code for providing the one or more user interactions with the search input box to multiple search engines, wherein each of the multiple search engines searches data associated with a corresponding application, where at least one corresponding application is a local application, and where at least one corresponding application is an online application. The instructions include code for receiving, within a predetermined amount of time after providing the one or more user interactions to the multiple search engines, search results from the multiple search engines. The instructions include code for presenting at least a portion of the received search results.

In some aspects, the disclosed subject matter relates to a system. The system includes one or more processors and a memory. The memory includes instructions. The instructions include code for presenting an application launcher user interface element, the application launcher user interface element including a search input box. The instructions include code for receiving one or more user interactions with the search input box. The instructions include code for providing the one or more user interactions with the search input box to multiple search engines, where each of the multiple search engines searches data associated with a corresponding application, where at least one corresponding application is a local application, and where at least one corresponding application is an online application. The instructions include code for receiving, within a predetermined amount of time after providing the one or more user interactions to the multiple search engines, search results from the multiple search engines. The instructions include code for presenting, within the application launcher user interface element, at least a portion of the received search results.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

The subject technology provides techniques for generating and presenting search results responsive to a search query. According to some implementations, a computing device receives a search query, for example, via an application launcher of the computing device. Alternatively, the search query may be received via any interface enabling access to multiple applications, for example, an omnibox of a browser. The multiple applications may include hosted applications, packaged applications, browser applications, mobile applications, tablet computer applications, or laptop/desktop computer applications. The computing device provides the search query to multiple search engines. Each of the multiple search engines has a corresponding data store, and the multiple search engines include at least one local search engine configured to search a local data store of the computing device and at least one online search engine configured to search an online data store. The multiple search engines may include a search engine for searching local files, a search engine for searching local applications, a search engine for searching contents of local applications, a search engine for searching applications in an application store, a search engine for searching contents of applications in the application store, and a web search engine. The data store may correspond to an application. For example, a social networking data store may be associated with a social networking application or a local document data store may be associated with a local document manager application. The computing device receives, from the multiple search engines, multiple search results corresponding to the search query. The computing device sorts the multiple search results according to an order. The computing device presents, via a display device, at least a portion of the multiple search results, the portion of the multiple search results being selected based on the order.

In some examples, the order according to which the computing device sorts the multiple search results may include placing a threshold number (e.g., two) search results from each search engine at the beginning of the order, so that the user is first presented with the threshold number of search results from each search engine, before being presented with other search results. Alternatively, the order may be determined based on the orders of search results provided by each of the search engines. For instance, each search engine may provide a score for each search result generated by the search engine, and the order of all of the search results for all of the search engines may be determined based on the score.

Figure 1:
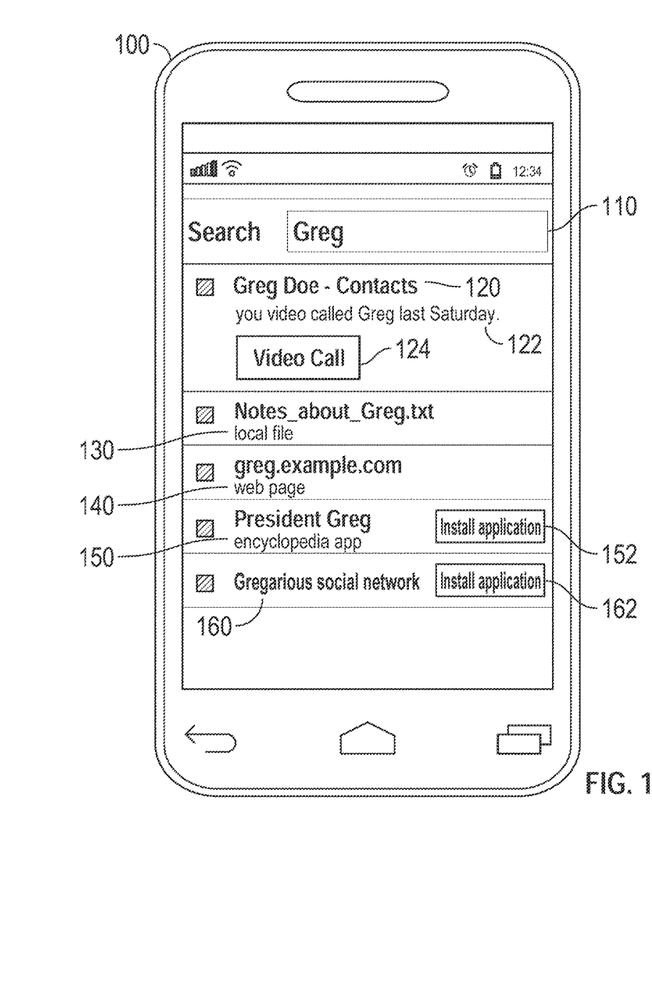
FIG. 1 illustrates a first example interface for presenting search results.

FIG. 1 illustrates an example interface 100 for presenting search results. The interface 100 includes a search input box 110 and search results 120, 130, 140, 150, and 160. The search input box 110 includes the search query "Greg." The search result 120 is "Greg Doe," a contact stored at a computing device associated with the interface 110. The search result 120 may have been generated by a search engine for searching within a local contact list of the computing device. The search result 120 is associated with additional information "You video called Greg last Saturday," 122, and an action button 124 for initiating a video call with Greg. The action button 124 is selected based on the additional information 122. The search result 130, "Notes_About_Greg.txt" is a local file which may have been generated by a search engine for searching local files. The search result 140 is a webpage which may have been generated by a web search engine. The search result 150 is a content (article titled "President Greg") of an application "Encyclopedia App" that is not installed on the computing device but is available in an application store. The search result 150 may have been generated by a search engine for searching contents of applications in the application store. The search result 150 is associated with an "install application" button 152 for installing the "Encyclopedia App" so the user can view the "President Greg" article. The search result 160 is an application "Gregarious Social Network" that is not installed on the computing device. Thus, the search result 160 is associated with an "install application" button 162 for installing the "Gregarious Social Network" application. The search result 160 may have been generated by a search engine for searching applications in the application store.

Figure 2:
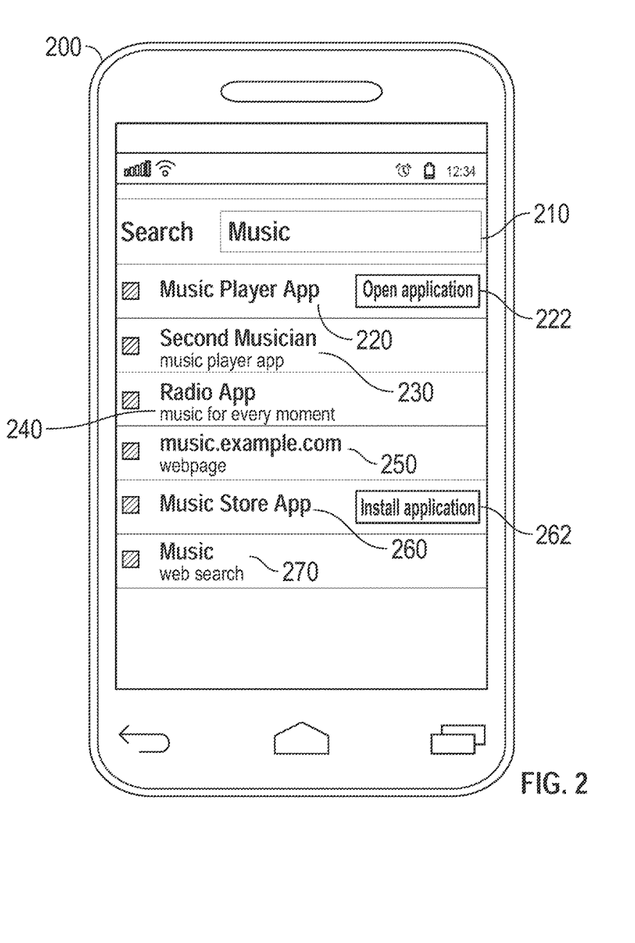
FIG. 2 illustrates a second example interface for presenting search results.

FIG. 2 illustrates an example interface 200 for presenting search results. The interface 200 includes a search input box 210 and search results 220, 230, 240, 250, 260, and 270. The search input box 110 includes the search query "Music." The search result 220 is an application "Music Player App" installed on a computing device associated with the interface 200. The search result 220 is associated with an "open application" button 222. The search result 220 may have been generated by a search engine for searching local applications. The search result 230 is a content "Second Musician" of the Music Player App, for example, an audio file, an audio album, or an artist page within the Music Player App. The search result 230 may have been generated by a search engine for searching contents of local applications. The search result 240 is an application "Radio App" installed on the computing device. The Radio App has a description, "Music for every moment." The search result 240 may have been generated by a search engine for searching descriptions of local applications. The search result 250 is a webpage which may have been generated by a web search engine. The search result 260 is an application "Music Store App" that is not installed on the computing device. Thus, the search result 260 is associated with an "install application" button 262 for installing the "Music Store App." The search result 260 may have been generated by a search engine for searching applications in the application store. The search result 270 is a link for viewing search results for the search query "Music" in a web search application. The search result 270 may have been generated by a web search application. The web search application may be accessible via a browser or may be installed on the computing device.

Figure 3A:
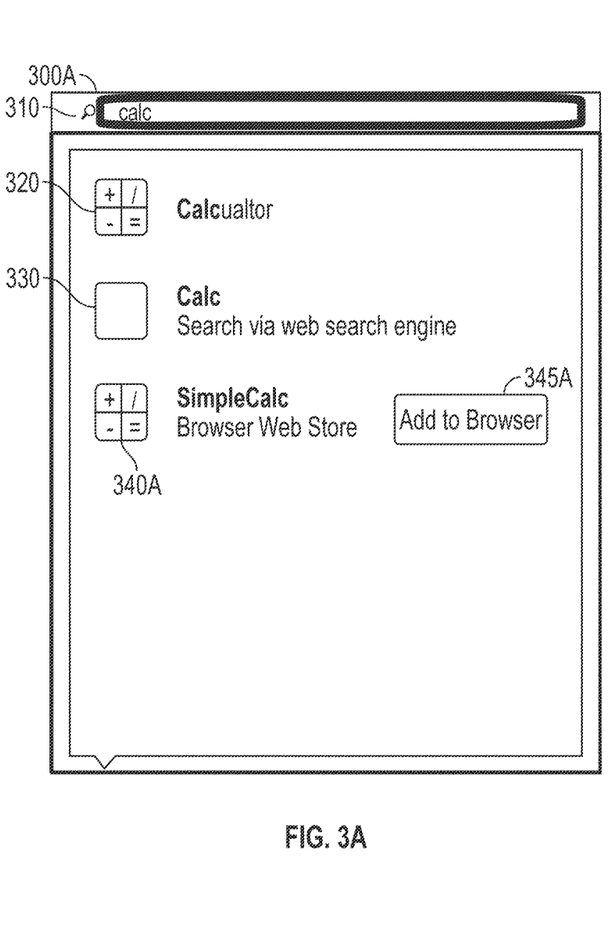
FIGS. 3A-3B illustrate a third example interface for presenting search results.
Figure 3B:
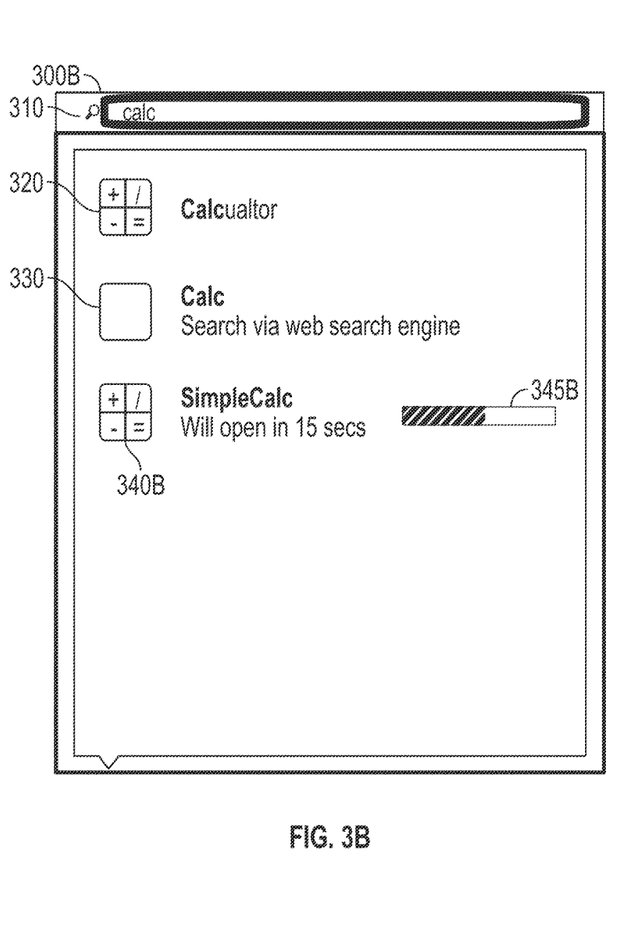

FIGS. 3A-3B illustrate another example interface 300A and 300B for presenting search results.

As shown the interface 300A of FIG. 3A, the user has entered the search query "calc" in the search input box 310. In response, the search results 320, 330, and 340A are presented. The search result 320A is a calculator application, which may have been generated by a search engine for searching local applications that are installed on the computing device presenting the interface 300A. The search result 330 is a link to search for the search query "calc" via a web search engine, and may be associated with a web search engine application or data store. The search result 340A is a "simple calc" application available via a browser web store, and may be associated with a search engine for searching applications in the browser web store or a search engine for the browser web store application. The search result 340A is associated with a button 345A which, when selected, causes the "simple calc" browser application to be added to the browser.

The interface 300B of FIG. 3B is similar to the interface 300A of FIG. 3A and may be presented in response to the selection of the "add to browser" button 345A of FIG. 3A. Similar to the interface 300A, the interface 300B includes the search input box 310 with the search query "calc" and the search results 320 and 330. The "simple calc" search result 340A of FIG. 3A is transformed into the "simple calc" search result 340B in response to the selection of the "add to browser" button 345A of FIG. 3A to indicate that the "simple calc" browser application is being loaded on the browser. The "simple calc" search result 340B includes the text "will open in 15 secs . . . " to indicate that the loading will be finished and the "simple calc" browser application will be opened in 15 seconds. The "simple calc" search result 340B includes the loading bar 345B, which provides a visual indication of a portion of the "simple calc" browser application that has been loaded onto the browser.

As illustrated in FIGS. 3A-3B, a browser application (e.g., "simple calc" search result 340A/340B), searchable via search engine associated with a browser application store data store application may be searchable through an application launcher search input box (e.g., input box 310A/310B) and may be a search result from a search entered in the application launcher search input box.

Search engines in addition those described above may also be used in conjunction with the subject technology. For example, a computing device may have a social networking application installed thereon, and one of the search results, in addition to those illustrated in FIG. 1, FIG. 2, or FIGS. 3A-3B may be a search for the search query in the social networking application or a result of a search for the search query in the social networking application.

Figure 4:
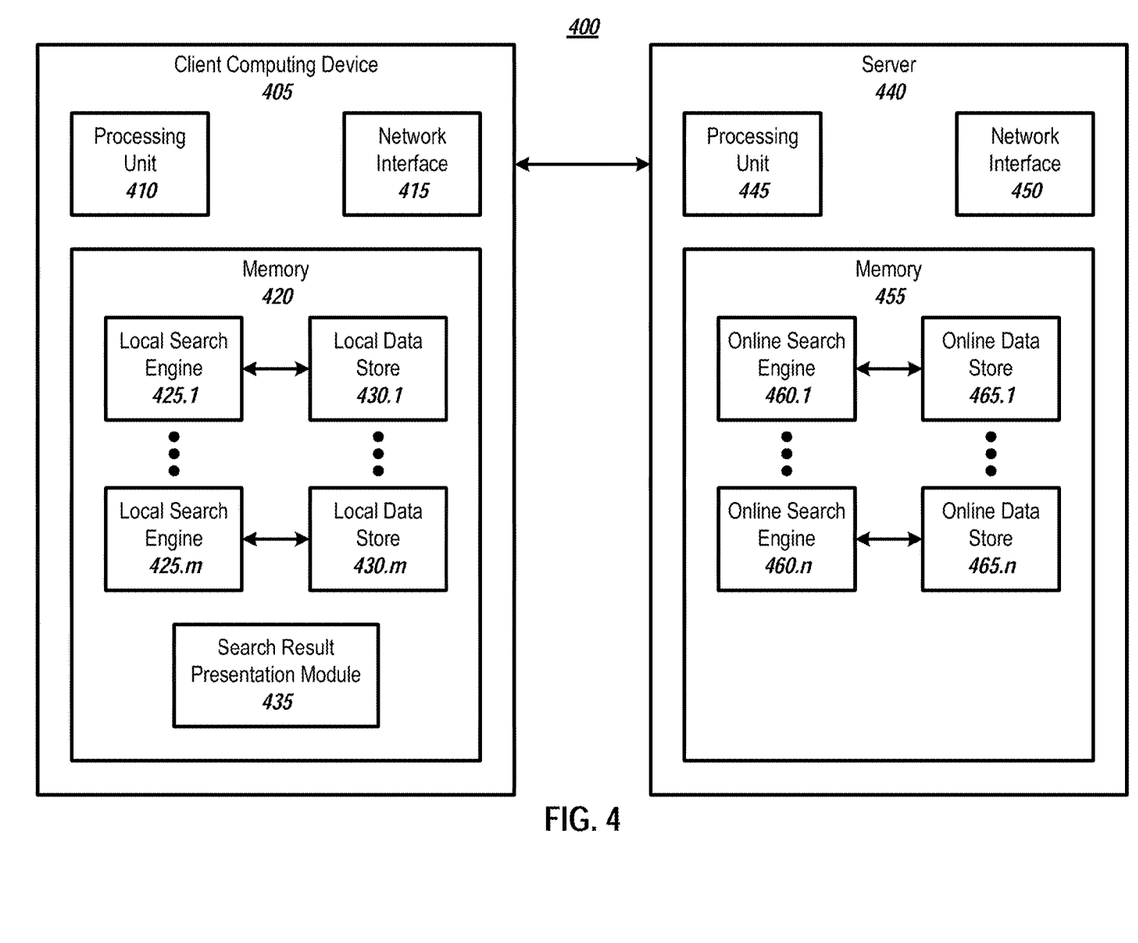
FIG. 4 illustrates an example system for presenting search results.

FIG. 4 illustrates an example system 400 for presenting search results. As shown, the system 400 includes a client computing device 405 and a server 440 configured to communicate with one another via a network. The network may include the Internet, an intranet, a local area network, a wide area network, a wired network, a wireless network, a virtual private network (VPN), etc.

The client computing device 405 may be a laptop computer, a desktop computer, a tablet computer, a mobile phone, a personal digital assistant (PDA), an electronic music player, etc. The client computing device 405 may display one or more of the interfaces 100, 200, 300A, or 300B of FIGS. 1, 2, and 3A-3B. As shown, the client computing device 405 includes a processing unit 410, a network interface 415, and a memory 420. The processing unit 410 includes one or more processors. The processing unit may include a central processing unit (CPU), a graphics processing unit (GPU), or any other processing unit. The processing unit 410 is configured to execute computer instructions that are stored in a computer-readable medium, for example, the memory 420. The network interface 415 is configured to allow the client computing device 405 to transmit and receive data in the network, for example, to communicate with the server 440. The memory 420 stores data and/or instructions. The memory 420 may be one or more of a cache unit, a storage unit, an internal memory unit, or an external memory unit. As illustrated, the memory 420 includes local search engines 425.1-$m$ associated with local data stores 430.1-$m$ and a search result presentation module 435.

Each local search engine 425.$k$ (where k is a number between 1 and m) is configured to search a local data store 430.$k$. Each local data store 430.$k$ is stored locally at the client computing device 405. Each local data store 430.$k$ may be associated with a local application, for example, a contact list application, a photograph application, a video application, a document manager application, a spreadsheet application, a business presentation application.

The search result presentation module 435, when executed, causes the processing unit 410 to receive a search query and provide the received search query to local search engines 425.1-$n$ at the client computing device and to remote online search engines. The search result presentation module 435 causes the processing unit 410 to receive search results from the local search engines 425.1-$n$ and from the remote online search engines and to present at least a portion of the received search results. Examples of the operation of the search result presentation module 435 are discussed in more detail in conjunction with FIGS. 5-6 below.

While the server 440 is illustrated as single machine, the server 440 may be implemented as a single machine or as multiple different, remote machines. For example, one or more of the online search engines or the online data stores stored at the server 440 may be stored at different machines.

As shown, the server 440 includes a processing unit 445, a network interface 450, and a memory 455. The processing unit 445 includes one or more processors. The processing unit may include a central processing unit (CPU), a graphics processing unit (GPU), or any other processing unit. The processing unit 445 is configured to execute computer instructions that are stored in a computer-readable medium, for example, the memory 455. The network interface 450 is configured to allow the server 440 to transmit and receive data in the network, for example, to communicate with the client computing device 405. The memory 455 stores data and/or instructions. The memory 455 may be one or more of a cache unit, a storage unit, an internal memory unit, or an external memory unit. As illustrated, the memory 455 includes online search engines 460.1-$n$ associated with online data stores 465.1-$n$. As shown, all of the online search engines 460.1-$n$ and all of the online data stores 465.1-$n$ reside at the same machine. However, according to some implementations, all or a portion of the online search engines 460.1-$n$ or the online data stores 465.1-$n$ reside at different machines and communicate with one another via the network.

Each online search engine 460.$k$ (where k is a number between 1 and n) is configured to search an online data store 465.$k$. Each online data store 465.$k$ is stored externally to the client computing device 405. Each online data store 465.$k$ may be associated with a local application, for example, a web search application, a mobile app store application, a browser app store application, a social networking application, an online document manager application, an email application, etc.

Figure 5:
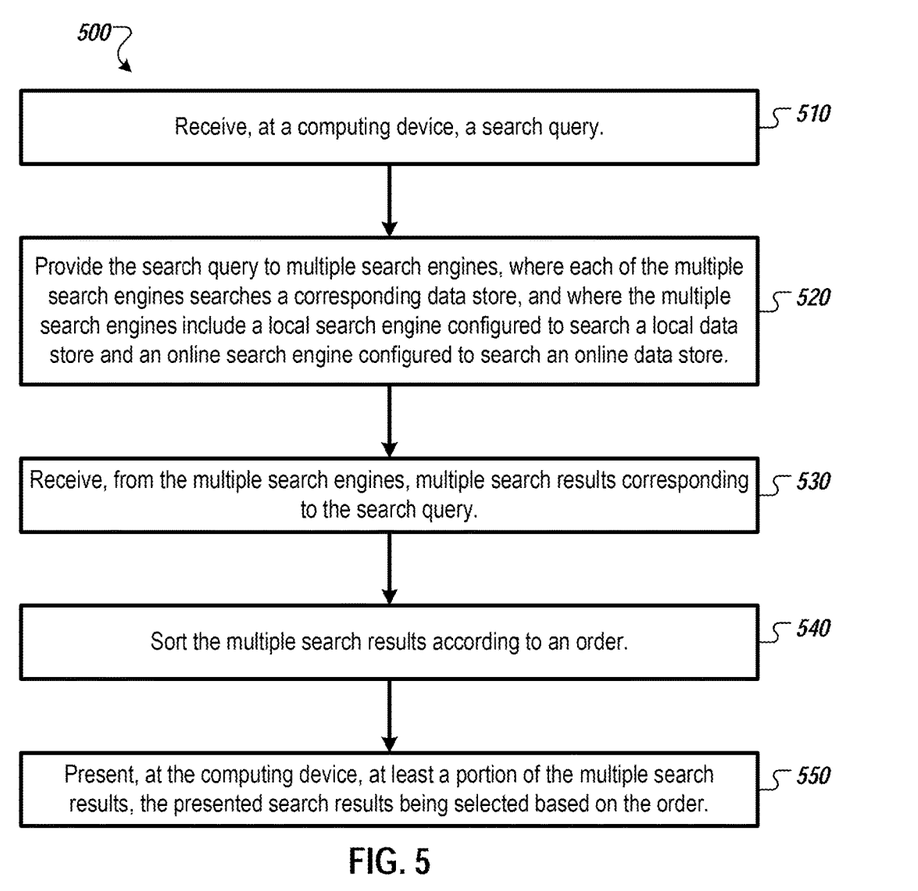
FIG. 5 illustrates an example process by which search results associated with data stores may be presented.

FIG. 5 illustrates an example process 500 by which search results associated with data stores may be presented.

The process 500 begins at step 510, where a computing device (e.g., client computing device 405, via operation of search result presentation module 435) receives a search query. For example, the search query may be entered at the computing device via an input box of an interface enabling access to multiple applications, for example, an application launcher or an omnibox of a browser with embedded browser applications, including hosted applications and packaged applications. The multiple applications accessible via the interface may include one or multiple of browser applications, mobile applications, tablet computer applications, or laptop/desktop computer applications. The computing device may present an application launcher user interface element (e.g., interface 100, 200, or 300A), where the application launcher user interface element includes a search input box (e.g., search input box 110, 210, or 310). The search query may include user interaction(s) with the search input box. For example, the search query may be a zero query (e.g., a selection of the search input box without entering text) or the search query may include one or more characters (e.g., the characters "calc" as illustrated in FIGS. 3A-3B) or one or more keystrokes while the search input box is selected. If the search query is a zero query, the search results received from the search engines may be selected based on stored information related to the computing device. The stored information may be stored at the computing device or at a server.

In step 520, the computing device provides the search query to multiple search engines (e.g., local search engines 425.1-$m$ and online search engines 460.1-$n$). According to some implementations, the search query is provided to the multiple search engines via a launcher search application programming interface (API). Each of the multiple search engines searches a corresponding data store. The multiple search engines include a local search engine configured to search a local data store (e.g., local search engine 425.*k* searches local data store 430.*k*) and an online search engine configured to search an online data store (e.g., online search engine 460.*k* searches online data store 465.*k*). One or more of the multiple search engines may have a corresponding application. For example, a local photograph search engine may correspond to local photograph viewing application or a camera application. An online social networking search engine may correspond to an online social networking application. Other examples of corresponding applications may include a local file application or a music player application.

In step 530, the computing device receives, from the multiple search engines, multiple search results corresponding to the search query. The computing device may receive the multiple search results, in step 530, within a predetermined amount of time (e.g., 100 milliseconds, 500 milliseconds, 1 second, 2 seconds, 10 seconds, etc.) after providing the search query to the multiple search engines in step 520. The predetermined amount of time may be specified by the launcher search API.

In step 540, the computing device sorts the multiple search results according to an order. The computing device may determine, for each search engine in the multiple search engines, a ranking of search results received from the search engine. The computing device may calculate, for each search result in the multiple search results, a normalized ranking score based on the ranking received from the search engine providing the search result. The computing device may sort the multiple search results according to the normalized ranking score.

In step 550, the computing device presents at least a portion of the multiple search results. The presented search results are selected based on the order. After step 550, the process 500 ends.

Figure 6:
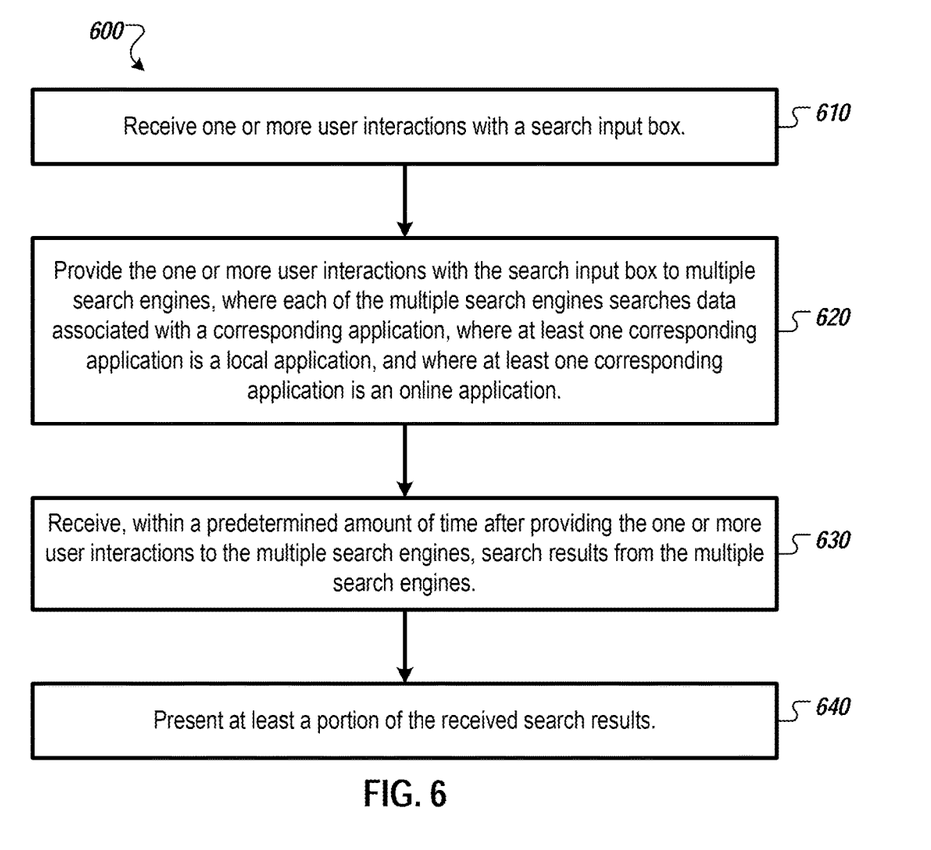
FIG. 6 illustrates an example process by which search results associated with applications may be presented.

FIG. 6 illustrates an example process 600 by which search results associated with applications may be presented.

The process 600 begins at step 610, where a computing device (e.g., client computing device 405, via operation of search result presentation module 435) receives one or more user interactions with a search input box (e.g., search input box 110, 210, or 310). The search input box may be a search input box for an application launcher or any other search input box, for example, a search input box for a browser. The one or more user interactions with the search input box may include a selection of the search input box (e.g., touching a touchscreen at the search input box or placing a cursor in the search input box) or one or more keystrokes (e.g., using a keyboard or a keypad) while the search input box is selected.

In step 620, the computing device provides the one or more user interactions with the search input box to multiple search engines. The one or more user interactions may be provided to the multiple search engines via a launcher search API. Each of the multiple search engines searches data associated with a corresponding application. One or more of the corresponding applications may have a corresponding data store. For example, a browser app store application may correspond to a browser app data store. At least one corresponding application is a local application and at least one corresponding application is an online application. The local application(s) may include a local file application, a local photograph application, or a local music player application. The online application(s) may include a web search application or a social networking application.

In step 630, the computing device receives, within a predetermined amount of time (e.g., 100 milliseconds, 500 milliseconds, 1 second, 2 seconds, 10 seconds, etc.) after providing the one or more user interactions to the multiple search engines, search results from the multiple search engines. The predetermined amount of time may be specified by the launcher search API.

In step 640, the computing device presents at least a portion of the received search results. The presented search results may be selected based on a ranking of search results from the multiple search engines. For example, search results having rankings within a ranking range, rankings exceeding a threshold ranking, or rankings below a threshold ranking may be presented. After step 640, the process 600 ends.

Figure 7:
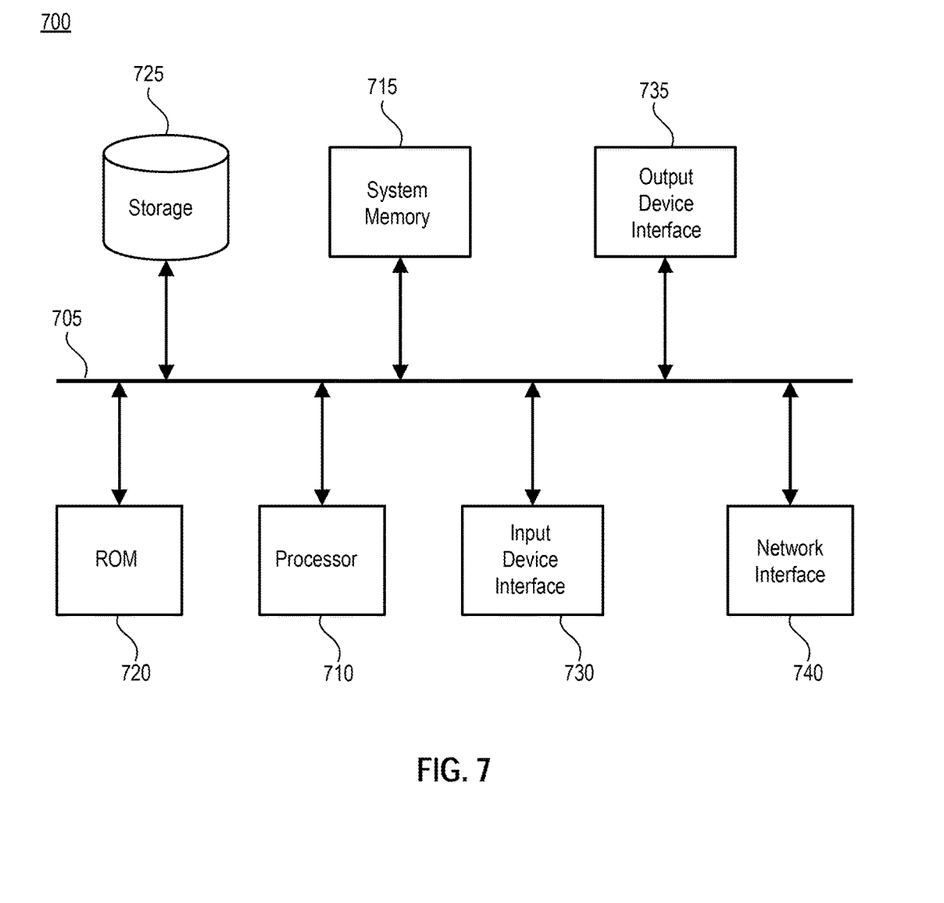
FIG. 7 conceptually illustrates an example electronic system with which some implementations of the subject technology are implemented.

FIG. 7 conceptually illustrates an electronic system 700 with which some implementations of the subject technology are implemented. For example, one or more of the server 440 or the client computing device 405 may be implemented using the arrangement of the electronic system 700. The electronic system 700 can be a computer (e.g., a mobile phone, PDA), or any other sort of electronic device. Such an electronic system includes various types of computer readable media and interfaces for various other types of computer readable media. Electronic system 700 includes a bus 705, processing unit(s) 710, a system memory 715, a read-only memory 720, a permanent storage device 725, an input device interface 730, an output device interface 735, and a network interface 740.

The bus 705 collectively represents all system, peripheral, and chipset buses that communicatively connect the numerous internal devices of the electronic system 700. For instance, the bus 705 communicatively connects the processing unit(s) 710 with the read-only memory 720, the system memory 715, and the permanent storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some implementations of the subject technology use a mass-storage device (for example a magnetic or optical disk and its corresponding disk drive) as the permanent storage device 725.

Other implementations use a removable storage device (for example a floppy disk, flash drive, and its corresponding disk drive) as the permanent storage device 725. Like the permanent storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the processes of the subject technology are stored in the system memory 715, the permanent storage device 725, or the read-only memory 720. For example, the various memory units include instructions for presenting search results from multiple sources in accordance with some implementations. From these various memory units, the processing unit(s) 710 retrieves instructions to execute and data to process in order to execute the processes of some implementations.

The bus 705 also connects to the input and output device interfaces 730 and 735. The input device interface 730 enables the user to communicate information and select commands to the electronic system. Input devices used with input device interface 730 include, for example, alphanumeric keyboards and pointing devices (also called "cursor control devices"). Output device interfaces 735 enables, for example, the display of images generated by the electronic system 700. Output devices used with output device interface 735 include, for example, printers and display devices, for example cathode ray tubes (CRT) or liquid crystal displays (LCD). Some implementations include devices for example a touch screen that functions as both input and output devices.

Finally, as shown in FIG. 7, bus 705 also couples electronic system 700 to a network (not shown) through a network interface 740. In this manner, the electronic system 700 can be a part of a network of computers (for example a local area network (LAN), a wide area network (WAN), or an Intranet, or a network of networks, for example the Internet. Any or all components of electronic system 700 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method for presenting search results, the method comprising:
    receiving, within an interface for enabling access to a plurality of applications at a computing device, a search query;
    providing the search query to a plurality of search engines, wherein each of the plurality of search engines searches a corresponding data store, and wherein the plurality of search engines comprise at least a search engine for searching local files, a search engine for searching local applications, and a search engine for searching applications in an application store;
    receiving, from the plurality of search engines, a plurality of search results corresponding to the search query;
    sorting the plurality of search results, wherein a first portion of the sorted search results includes at least a threshold number of search results from each of the plurality of search engines providing search results, and a second portion of the sorted search results includes a remainder of the search results from the plurality of search engines aggregated and sorted according to an order based on a ranking score for the plurality of search results; and
    presenting, at the computing device, the first portion and the second portion of the sorted search results, wherein, when a search result of the first portion of the sorted search results corresponds to a launchable application, the search result is associated with an actionable user interface element, and the actionable user interface element enables launching of the launchable application.

2. The method of claim 1, wherein the plurality of search engines further comprise:
    a search engine for searching contents of local applications, a search engine for searching contents of applications in the application store, a web search engine, and a search engine within a local application.

3. The method of claim 1, wherein the interface for enabling access to the plurality of applications comprises an application launcher of the computing device.

4. The method of claim 1, wherein the search query comprises a zero query, and wherein the plurality of search results are selected based on stored information related to the computing device.

5. The method of claim 1, wherein the search query comprises one or more characters.

6. The method of claim 1, wherein each search engine in at least a portion of the plurality of search engines has a corresponding application.

7. The method of claim 1, wherein the plurality of applications comprise hosted applications and packaged applications.

8. A non-transitory computer-readable medium comprising instructions which, when executed by a computer, cause the computer to perform one or more operations, the one or more operations comprising:
    receiving one or more user interactions with a search input box within an interface for enabling access to a plurality of applications;
    providing the one or more user interactions with the search input box to a plurality of search engines, wherein the plurality of search engines comprise at least a search engine for searching local files, a search engine for searching local applications, and a search engine for searching applications in an application store;

receiving, within a predetermined amount of time after providing the one or more user interactions to the plurality of search engines, search results from the plurality of search engines; and sorting the received search results, wherein a first portion of the sorted search results includes at least a threshold number of search results from each of the plurality of search engines providing search results, and a second portion of the sorted search results includes a remainder of the search results from the plurality of search engines aggregated and sorted according to an order based on a ranking score for the received search results, and wherein, when a search result of the sorted search results corresponds to a launchable application, the search result is presented with an actionable user interface element, and the actionable user interface element enables launching of the launchable application.

9. The non-transitory computer-readable medium of claim 8, wherein the one or more user interactions with the search input box comprise a selection of the search input box.

10. The non-transitory computer-readable medium of claim 9, wherein the received search results are selected based on stored information related to the computer.

11. The non-transitory computer-readable medium of claim 8, wherein the one or more user interactions with the search input box comprise one or more keystrokes while the search input box is selected.

12. The non-transitory computer-readable medium of claim 8, wherein providing the one or more user interactions with the search input box to the plurality of search engines comprises:

providing, via a launcher search application programming interface (API), the one or more user interactions with the search input box to the plurality of search engines, wherein the predetermined amount of time is specified by the launcher search API.

13. The non-transitory computer-readable medium of claim 8, wherein a portion of the plurality of search engines are associated with corresponding applications, and wherein the corresponding applications comprise one or more of a local file application, a photograph application, a music player application, or a social networking application.

14. The non-transitory computer-readable medium of claim 8, wherein the search input box is associated with an application launcher.

15. The non-transitory computer-readable medium of claim 8, wherein the plurality of applications comprise hosted applications and packaged applications.

16. A system comprising:
one or more processors; and
a memory comprising instructions which, when executed by the one or more processors, cause the one or more processors to perform one or more operations, the one or more operations comprising:

presenting an application launcher user interface element, the application launcher user interface element comprising a search input box;

receiving one or more user interactions with the search input box;

providing the one or more user interactions with the search input box to a plurality of search engines, wherein the plurality of search engines comprise at least a search engine for searching local files, a search engine for searching local applications, and a search engine for searching applications in an application store;

receiving, within a predetermined amount of time after providing the one or more user interactions to the plurality of search engines, search results from the plurality of search engines;

sorting the received search results, wherein a first portion of the sorted search results includes at least a threshold number of search results from each of the plurality of search engines providing search results, and a second portion of the sorted search results includes a remainder of the received search results from the plurality of search engines aggregated and sorted according to an order based on a ranking score for the received search results; and presenting, within the application launcher user interface element, the first portion and the second portion of the sorted search results, wherein, when a search result of the first portion of the sorted search results corresponds to a launchable application, the search result is associated with an actionable user interface element, and the actionable user interface element enables launching of the launchable application.

17. The system of claim 16, wherein the one or more user interactions with the search input box comprise a selection of the search input box.

18. The system of claim 16, wherein the received search results are selected based on stored information related a computing device that includes the one or more processors and the memory.

19. The system of claim 16, wherein the one or more user interactions with the search input box comprise one or more keystrokes while the search input box is selected.

20. The system of claim 16, wherein providing the one or more user interactions with the search input box to the plurality of search engines comprises:

providing, via a launcher search application programming interface (API), the one or more user interactions with the search input box to the plurality of search engines, wherein the predetermined amount of time is specified by the launcher search API.

* * * * *